United States Patent [19]

Tirpak et al.

[11] Patent Number: 5,124,400
[45] Date of Patent: Jun. 23, 1992

[54] AQUEOUS POLYURETHANE DISPERSIONS AND ADHESIVES BASED THEREON

[75] Inventors: Robin E. Tirpak, Wheeling; Robert L. Cline, Paden City, both of W. Va.

[73] Assignee: Miles Inc., Pittsburgh, Pa.

[21] Appl. No.: 412,046

[22] Filed: Sep. 25, 1989

[51] Int. Cl.⁵ .................... C08L 75/12; C08G 18/32; C09J 175/12
[52] U.S. Cl. .................... 524/591; 524/839; 524/840; 524/871; 524/874; 528/48; 528/60; 528/61; 528/68; 528/76; 528/80
[58] Field of Search ............... 524/591, 839, 840, 871, 524/874; 528/48, 60, 61, 76, 80, 68

[56] References Cited

U.S. PATENT DOCUMENTS

| | | | |
|---|---|---|---|
| 4,046,729 | 9/1977 | Scriven et al. | 524/591 |
| 4,066,591 | 1/1978 | Scriven et al. | 524/840 |
| 4,147,679 | 4/1979 | Scriven et al. | 524/839 |
| 4,203,883 | 5/1980 | Hangauer, Jr. | 524/591 |
| 4,387,181 | 6/1983 | Brown et al. | 524/714 |
| 4,408,008 | 10/1983 | Markusch | 524/507 |
| 4,501,852 | 2/1985 | Markusch et al. | 524/591 |
| 4,567,228 | 1/1986 | Gaa et al. | 524/588 |
| 4,582,873 | 4/1986 | Gaa et al. | 524/591 |
| 4,701,480 | 10/1987 | Markusch et al. | 524/840 |
| 4,742,095 | 5/1988 | Markusch et al. | 524/840 |
| 4,876,302 | 10/1989 | Noll et al. | 524/591 |
| 4,879,322 | 11/1989 | Markusch et al. | 524/839 |

*Primary Examiner*—John Kight, III
*Assistant Examiner*—Rabon Sergent
*Attorney, Agent, or Firm*—Joseph C. Gil

[57] ABSTRACT

The invention is related to an adhesive comprising a stable, fine particle size aqueous dispersion of polyurethane-urea which is the reaction product of an isocyanate-terminated prepolymer with an amine-containing chain extending agent which is characterized in that the functionality of said agent is about 2.05 to about 2.50. The adhesive was surprisingly and unexpectedly found to exhibit an increased softening point temperature as compared to the corresponding temperature of related adhesives which contains no such chain extending agent.

5 Claims, No Drawings

AQUEOUS POLYURETHANE DISPERSIONS AND ADHESIVES BASED THEREON

FIELD OF THE INVENTION

The present invention relates to aqueous polyurethane dispersions and to adhesives based thereon and more particularly to the use of a multi-functional amine-containing chain extender in such systems.

SUMMARY OF THE INVENTION

The invention is predicated on the surprising finding that the softening point temperature of an adhesive based on an aqueous polyurethane-urea dispersion is increased appreciably upon the incorporation of a multifunctional amine-containing chain extender, for instance diethylenetriamine, therewith. The improved durability of the adhesive thus produced is attained without effecting its tensile properties.

BACKGROUND OF THE INVENTION

Aqueous polyurethane-urea dispersions are well known. U.S. Pat. No. 4,501,852 and the several patents referred to therein represent relevant art. These dispersions are primarily used as films, coatings or adhesives because of their good profile of properties.

An object of the invention is to provide aqueous polyurethane-urea dispersions useful for the preparation of adhesives having high softening point temperatures. The softening point temperature referred to in the present context is measured in accordance with ASTM D-816 (in peel) and often used as a criterion to determine the durability of adhesives.

It was surprisingly found that the dispersion of the invention which comprise a relatively small amount of a multi-functional amine-containing chain extending agent is useful for the preparation of an adhesive which exhibits a higher softening point temperature, an excellent level of adhesion to substrates, including plasticized PVC, and a virtually unchanged tensile strength as compared to systems which include no such agent.

DETAILED DESCRIPTION OF THE INVENTION

In accordance with the present invention there is provided an aqueous polyurethane dispersion comprising a multi-functional amine-containing chain extending agent which dispersion is suitable for the preparation of adhesives.

The aqueous polyurethane dispersion-based adhesive is preferably prepared by a two stage process wherein an isocyanate-terminated prepolymer is formed in the first stage by reacting an excess of a polyisocyanate with an isocyanate-reactive component. The isocyanate terminated prepolymer is then chain extended in a second stage, before, during or after being mixed with an aqueous medium, to form the dispersion of the invention. The resulting aqueous dispersion is stable and is suitable for use as an adhesive. The amine- containing chain extending agent suitable in accordance with the present invention is characterized in that its average functionality is about 2.05 to 2.50, preferably 2.05 to about 2.20.

The preparation of a stable aqueous dispersion suitable in the present context has been described in U.S. Pat. No. 4,501,852 the relevant disclosure of which is incorporated by reference herein.

Essentially, the isocyanate terminated prepolymers of the present invention are prepared by reacting the polyisocyanate component with an organic component which contains at least two isocyanate-reactive groups, the component containing at least one ionic, preferably sulfonate, group. The ratio of isocyanate groups to isocyanate reactive groups is maintained at about 1.1 to 3, preferably about 1.2 to 2 and most preferably about 1.5 to about 1.8 on an equivalent basis. The components are reacted to produce the isocyanate terminated prepolymer following conditions and procedures which are well known in the relevant art. The reaction temperature during the production of the prepolymer is normally maintained at below 150° C., preferably between 50° and 130° C. The reaction is continued until the amount of unreacted isocyanate reactive groups is essentially zero. The finished prepolymer should have a free isocyanate content of about 1 to 8%, preferably about 1 to 5% by weight based on the weight of the prepolymer solids. The molecular weight of the prepolymer should be less than about 25,000 preferably between 600 and 12,000. It is possible to carry out the prepolymer reaction in the presence of a suitable catalyst, such as an organo-tin compound, or a tertiary amine; although the use of a catalyst is not necessary and is not preferred.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon pyrrolidones, e.g., N-methyl-2-pyrrolidinones, hydrogenated furans, aromatic hydrocarbons, and the like, and mixtures thereof. The amount of solvent employed should be sufficient to provide a prepolymer solution having a sufficiently low viscosity to enhance the formation of the urea-urethane dispersion of this invention; however, the solutions may be successfully employed in forming the dispersions even though the viscosity of the solution is relatively high at the temperature of dispersion. Such viscosities may be as low as 100 centipoise or above 10,000 centipoise, and only mild agitation need be employed to form the dispersion, even in the absence of an external emulsifying agent. Often about 0.01 to 10 parts by weight of solvent, preferably about 0.02 to 2 parts by weight of solvent, per part by weight based on the weight of a solvent for the prepolymer can be used. However, the presence of a solvent for the prepolymer or the urea-urethane is not necessary to provide a stable, aqueous dispersion. Often, when solvent is employed during the preparation of the isocyanate-terminated prepolymer and/or the urea-urethane prepolymer it is desirable to remove at least a portion of the solvent from the aqueous dispersion. Advantageously, the solvent to be removed from the dispersion has a lower boiling point than water and thus can be removed from the dispersion by, for example, distillation. The removal of the low boiling solvent is desirably conducted under conditions which are not deleterious to the urea-urethane polymer such as vacuum distillation or thin film evaporation conditions. A solvent having a higher boiling point than water such as dimethyl formamide, N-methyl-2-pyrrolidinone, and the like, may be employed, in which case the higher boiling solvent is generally retained in the aqueous dispersion of urea-urethane polymer to enhance the coalescence of the urea-urethane polymer particles during film formation.

The isocyanate-terminated prepolymers of the present invention are prepared from
(a) organic polyisocyanates which contain at least two aromatically, aliphatically or cycloaliphatically bound isocyanate groups,
(b) organic compounds which have at least two isocyanate-reactive groups,
(c) organic compounds which are monofunctional or difunctional in the context of the isocyanate-polyaddition reaction and which contain hydrophillic ethylene oxide units and, optionally
(d) organic compounds which are monofunctional or difunctional in the context of the isocyanate-polyaddition reaction and which contain ionic groups or potential ionic groups.

Examples of suitable polyisocyanates (a) for the preparation of the prepolymers of the invention are organic isocyanates represented by:

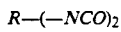

$$R\text{—}(\text{—}NCO)_2$$

wherein R represents an organic group obtainable by removal of the isocyanate group from an organic diisocyanate having a molecular weight of about 112 to 1000, and preferable about 140 to 400. Preferably, R denotes a divalent aliphatic hydrocarbon group having 4–18 carbon atoms, a divalent cycloaliphatic hydrocarbon group having 5–15 carbon atoms, or an araliphatic hydrocarbon group having 7–15 carbon atoms. Examples of the organic diisocyanates which are particularly suitable for the process include tetramethylene diisocyanate, 1,6-hexamethylene diisocyanate, dodecamethylene diisocyanate, cyclohexane-1,3- and 1,4-diisocyanate, 1-isocyanato-3-isocyanatomethyl-3,5,5-trimethyl-cyclohexane (isophorone methane;1,3 and 1,4-bis-(isocyanatomethyl)cyclohexane, and bis-(isocyanato-3-methylcyclohexyl)-methane and aromatic diisocyanates such as 2,4 diisocyanato toluene, 2,6-diisocyanatotoluene and mixtures of these. Mixtures of diisocyanates can of course be used.

The organic compound (b) containing at least two isocyanate-reactive groups can be divided into two groups, i.e., high molecular weight compounds with molecular weights from about 300 to 6,000, preferably from about 300 to 3,000, and low molecular weight compounds with molecular weights below about 300. Examples of the high molecular weight compounds are:

1) dihydroxy polyesters generally known in polyurethane chemistry which are obtained from dicarboxylic acids (such as succinic acid, adipic acid, suberic acid, azelaic acid, sebacic acid, phthalic acid isophthalic acid, terephthalic acid tetrahydrophthalic acid and the like) and diols such as ethylene glycol, propylene glycol-(1,2), propylene glycol-(1,3), diethylene glycol, butanediol-(1,4), butanediol-(1,3), hexanediol-(1,6), octanediol-(1,8), neopentyl glycol, 2-methylpropanediol-(1,3), the various isomeric bis-hydroxymethyl cyclohexanes, and the like);

2) polylactones generally known from polyurethane chemistry, e.g., polymers of ε-caprolactone started on the above-mentioned dihydric alcohols;

3) polycarbonates generally known from polyurethane chemistry, obtainable by, for example, reaction of the above-mentioned diols with diarylcarbonates or phosgene:

4) polyethers generally known in polyurethane chemistry; examples include the polymers or copolymers of styrene oxide, propylene oxide, tetrahydrofuran, butylene oxide or epichlorohydrin, which may be prepared with the aid of divalent starter molecules such as water, the above-mentioned diols or amines containing two NH bonds; certain proportions of ethylene oxide may also be included, provided the polyether used does not contain more than about 10% by weight of ethylene oxide; however, polyethers obtained without the addition of ethylene oxide are generally used;

5) polythioethers, polythio mixed ethers and polythio ether esters generally known in polyurethane chemistry;

6) polyacetals generally known in polyurethane chemistry, for example, those obtained from the above-mentioned diols and formaldehyde; and 7) difunctional polyether esters containing isocyanate-reactive end groups generally known in the art.

The compounds of the above-described type preferably used in the process according to the invention are dihydroxy polyesters, dihydroxy polylactones, dihydroxy polyethers and dihydroxy polycarbonates.

The low molecular weight compounds which may be used in the process for the preparation of the isocyanate-terminated prepolymers include, for example, the low molecular weight diols which have been described for the preparation of dihydroxy polyesters; diamines such as diaminoethane, 1,6-diaminohexane, piperazine, 2,5-dimethylpiperazine, 1-amino-3-aminomethyl-2,5,5-trimethylcyclohexane, bis-(4-aminocyclohexyl)-methane, bis-(4-amino-3-cyclohexyl)-methane, 1,4-diaminocyclohexane, 1,2-propylenediamine, hydrazine, amino acid hydrazides, hydrazides of semicarbazidocarboxylic acids, bis-hydrazides and bis-semicarbazides; and the like.

In addition to the above-mentioned components which are preferably difunctional in the isocyanate polyaddition reaction, monofunctional and even small proportions of trifunctional and higher functional components generally known in polyurethane chemistry, such as trimethylolpropane, may be used in special cases in which slight branching of the isocyanate-terminated prepolymer is desired. However, these prepolymers should be substantially linear and this may be achieved by maintaining the average functionality of the prepolymer starting- components below about 2.1.

The reaction components which ensure the dispersibility of the polyurethanes herein include compounds containing lateral or terminal, hydrophilic ethylene oxide units (c) and compounds containing ionic group(s) or potential ionic group(s) (d). Component (c) is used in an amount sufficient to provide a content of hydrophilic ethylene oxide units of about 0.35 to 10% by weight, preferably about 0.8 to 10% by weight, more preferably about 1.0 to 6.0% by weight, and most preferably about 2.0 to 6.0% by weight, based on the weight of the prepolymer. Component (d) is used in an amount sufficient to provide an ionic group content of about 0 to 120 milliequivalents, preferably 0 to 80 milliequivalents, more preferably about 10 to 60 milliequivalents per 100 grams of prepolymer. Components (c) and (d) may be either monofunctional or difunctional in the context of the isocyanate-polyaddition reaction. Suitable compounds include:

(c) a nonionic hydrophilic component selected from
  (i) diisocyanates which contain lateral, hydrophilic ethylene oxide units,
  (ii) compounds which are difunctional in the isocyanate-polyaddition reaction and contain lateral, hydrophilic ethylene oxide units,
  (iii) monoisocyanates which contain terminal, hydrophilic ethylene oxide units,
  (iv) compounds which are monofunctional in the isocyanate-polyaddition reaction and contain terminal, hydrophilic ethylene oxide units, and
  (v) mixtures thereof; and optionally, (d) an ionic hydrophilic component selected from
  (i) monoisocyanates or diisocyanates which contain ionic group(s) or potential ionic group(s), and
  (ii) compounds which are monofunctional or difunctional in the isocyanate-polyaddition reaction and contain ionic group(s) or potential ionic group(s).

The preferred difunctional hydrophilic components having lateral hydrophilic chains containing ethylene oxide units include compounds corresponding to the following general formula:

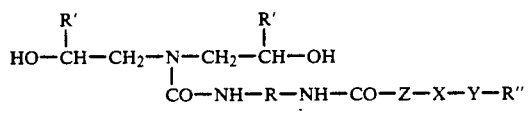

and/or compounds corresponding to the following general formula:

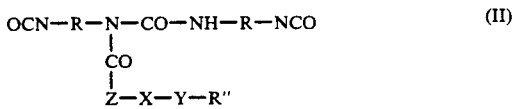

Preferred difunctional hydrophilic components (a) are those corresponding to the general formula (I) and (II) above, R represents a difunctional radical of the type obtained by removing the isocyanate groups from a diisocyanate corresponding to the general formula:

of the above-mentioned type;

R' represents hydrogen or a monovalent hydrocarbon radical containing from 1 to 8 carbon atoms, preferably a hydrogen atom or a methyl group;

R" represents a monovalent hydrocarbon radical having from 1 to 12 carbon atoms, preferably an unsubstituted alkyl radical having from 1 to 4 carbon atoms;

X represents the radical obtained by removal of the terminal oxygen atom from a polyalkylene oxide chain having from about 5 to 90 chain members preferably from about 20 to 70 chain members, of which at least about 40%, preferably at least about 65%, comprises ethylene oxide units and the remainder comprises other alkylene oxides such as propylene oxide, butylene oxide or styrene oxide units, preferably propylene oxide units;

Y represents oxygen or —NR'''— wherein R''' has the same definition as R"; and

Z represents a radical which corresponds to Y, but may additionally represent —NH—.

The compounds corresponding to general formulae (I) and (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60% by weight based on polyether segment, of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

Other particularly preferred hydrophilic components for incorporating lateral or terminal hydrophilic chains containing ethylene oxide units include compounds corresponding to the following general formula:

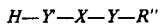

and/or compounds corresponding to the following general formula:

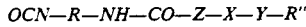

wherein

X, Y, Z, R and R" are as defined above; and and Y' corresponds in its meaning to Y, but may additionally represent —NH—.

Monofunctional polyethers are preferably used, but preferably only in molar quantities of ≦10%, based on the polyisocyanate used, to guarantee the required high molecular weight structure of the polyurethane elastomers. In cases where relatively large molar quantities of monofunctional alkylene oxide polyethers are used, it is advantageous also to use trifunctional compounds containing isocyanate-reactive hydrogen atoms, although the average functionality of the synthesis components should preferably not exceed about 2.1 in order to obtain substantially linear prepolymers.

The monofunctional hydrophilic synthesis components are produced in accordance with the processes described in U.S. Pat. Nos. 3,905,929 and 3,920,598 by alkoxylating of the monofunctional starter, such as n-butanol or n-methyl butylamine, using ethylene oxide and optionally another alkylene oxide, for example, propylene oxide. The resultant product may be optionally further modified (although this is less preferred) by reaction with excess quantities of diisocyanates or by reaction with ammonia to form the corresponding primary aminopolyethers.

The second hydrophilic component (d) contains potential ionic group(s) or their corresponding ionic group(s). The ionic groups may be cationic or anionic, although the anionic groups are preferred. Examples of anionic groups include —COO$^\ominus$ and —SO$_3{}^\ominus$. Examples of cationic groups are —N—⊕ and —S—⊕

These ionic groups are formed by neutralizing the corresponding potential ionic groups either prior to, during or after forming the isocyanate-terminated prepolymer. When the potential ionic groups are neutralized prior to forming the isocyanate-terminated prepolymer, the ionic groups are incorporated directly. When neutralization is performed subsequent to forming the prepolymer, potential ionic groups are incorporated.

Suitable compounds for incorporating the previously discussed carboxylate, sulfonate and quaternary nitrogen groups are described in U.S. Pat. Nos. 3,479,310 and 4,108,814, the disclosures of which are herein incorporated by reference. Suitable compounds for incorporating tertiary sulfonium groups are described in U.S. Pat. No. 3,419,533, also incorporated by reference. The neutralizing agents for converting the potential ionic groups to ionic groups are also described in the above-mentioned U.S. patents. Within the context of this invention, the term "neutralizing agents" is meant to embrace all types of agents which are useful for converting potential ionic groups to ionic groups. Accordingly, this term also embraces quaternizing agents and alkylating agents.

The preferred ionic groups for use in this invention are aliphatic diols containing sulfonate groups. These ionic groups are prepared prior to formation of the isocyanate prepolymer and as such the ionic groups are directly incorporated into the prepolymer. Diol sulfonates of this type have been disclosed in U.S. Pat. No. 4,108,814 the disclosure of which in this regard is incorporated herein by reference.

The neutralization step may be conducted
(1) prior to the prepolymer formation by treating the component containing the potential ionic group(s) or by using compounds in the prepolymer formation which have been specifically synthesized to contain ionic groups,
(2) after prepolymer formation, but prior to dispersing the prepolymer or,
(3) by adding the neutralizing agent to all Dr a portion of the dispersing water.

After neutralization according to alternative 1 and 2 above or during neutralization if alternative 3 is used, a dispersion of the prepolymer in water is formed. This may be done by the following method:

The prepolymer is added to the water, either in a batch-type process or continuously by using pin-mixers. When this method is used, significant increases in viscosity do not occur. In addition, if alternative 3 is used for neutralization, all of the neutralization agent is present in the water prior to the addition of the prepolymer.

The prepolymer is usually added in increments to the water or water-neutralizing agent mixture. The aqueous mixture is preferably agitated during the addition of the prepolymer to assist in forming the dispersion. Any low boiling solvent present during prepolymer formation may be removed prior to dispersing the prepolymer; however, it is preferred to remove the solvent after the dispersion is formed since the solvent will facilitate the formation of the dispersion, and also, the subsequent cross-linking reaction with the polyfunctional amine.

After the formation of the dispersed, isocyanate-terminated prepolymer the polyfunctional amine cross-linking agent should be added before the reaction of the terminal isocyanate groups with water proceeds to any significant extent, normally within about 30 minutes, preferably within about 15 minutes.

The cross-linked, urea-urethane products of the present invention are formed by reacting the dispersed prepolymer with a polyfunctional amine or a mixture of polyfunctional amines. The average functionality of the amine, i.e., the number of amine nitrogens per molecule, should be between about 2.05 and 2.50, preferably between about 2.05 and 2.20. The desired functionalities can be obtained by using mixtures of polyamines. For example, a functionality of 2.5 can be achieved by using equimolar mixtures of diamines and triamines. Other suitable mixtures for obtaining the desired functionalities will be readily apparent to those of ordinary skill in the art.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain between about 1 to 30 carbon atoms, preferably about 2 to 15 carbon atoms, and most preferably about 2 to 10 carbon atoms. These polyamines may contain additional substituents provided that they are not as reactive with isocyanate groups as the primary or secondary amines. Examples of polyamines for use in the present invention include the amines listed as low molecular compounds containing at least two isocyanate-reactive amino hydrogens, and also diethylene triamine, triethylene tetramine, tetraethylene pentamine, pentaethylene hexamine, N,N,N-tris-(2-aminoethyl)amine, N-(2-piperazinoethyl) ethylene diamine, N,N'-bis-(2-aminoethyl)piperazine, N,N,N'-tris-(2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-piperazine, N-(2-aminoethyl)-N'-(2-piperazinoethyl)ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapolylenepentamine, tripropylentetramine, N,N-bis-(6-aminohexyl)amine, N,N'-bis-(3-aminopropyl)-ethylene diamine and 2,4-bis-(4'-aminobenzyl)-aniline. Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diaminohexane, ethylene diamine, diethylene triamine, triethylene tetramine, tetraethylene pentamine and pentaethylene hexamine.

The amount of polyfunctional amine to be used in accordance with the present invention is dependent upon the number of terminal isocyanate groups in the prepolymer. Generally, the ratio of terminal isocyanate groups of the prepolymer to the amino hydrogens of the polyfunctional amine is between about 1.0:0.06 and 1.0:1.1, preferably between about 1.0:0.8 and 1.0:0.98 on an equivalent basis. Lesser amount of polyfunctional amine will allow for too much undesired reaction of the isocyanate groups with water, while an undue excess may lead to products with low molecular weight and less than the desired amount of cross-linking. For the purposes of these ratios a primary amino group is considered to have one amino hydrogen. For example, ethylene diamine has two equivalents of amino hydrogens and diethylene triamine has three equivalents.

The reaction between the dispersed prepolymer and the polyamine is conducted at temperatures from about 5° to 90° C., preferably from about 20° to 90° C., and most preferably from about 30° to 60° C. The reaction conditions are normally maintained until the isocyanate groups are essentially completely reacted. In order to reduce the presence of localized concentration gradients, the polyamine is preferably added in increments to the dispersed prepolymer which is normally agitated to ensure complete mixing of the polyamine throughout the aqueous medium. The polyamine may be added to the aqueous medium in its pure form or it may be dissolved or dispersed in water or an organic solvent. Suitable organic solvents are those previously described for use in preparing the isocyanate-terminated prepolymer.

The Softening Point entailed in the present invention is determined in accordance with ASTM D-816 which is incorporated herein by reference. Essentially, the testing of the softening point of an adhesive is determined by bonding two samples of canvas and aging them for one week. The sample is then hanged in a temperature programmable oven with a one kilogram dead load hanging from the sample so as to peel the two substrates apart. As the temperature is increased, the bond fails and the substrates separate. The temperature at the instant of failure is noted as the softening point.

The invention is further illustrated but is not intended to be limited by the following examples in which all parts and percentages are by weight unless otherwise specified.

EXAMPLES

Example 1

The invention has been demonstrated as follows: An isocyanate-terminated prepolymer (1) was prepared from the following charge:

| Grams | Equivalent weight (EW) | Charge |
|---|---|---|
| 1000 | 1000 | 1,4 butanediol adipate, (Desmophen 2502) |
| 223 | 322 | polyether mixture* |
| 292.9 | 111 | Isophorone diisocyanate (IPDI) |
| 102.4 | 84 | Hexamethylene diisocyanate, (Desmodur H) |

*the polyether mixture consists of a blend of 128.9 gm of the adduct formed by the addition of sodium hydrogen sulfate to propoxylated 1,4-butanediol (average molecular weight 428), 54.2 gm of a polyether monoalcohol prepared from 1,4-butanediol, propylene oxide and ethylene oxide (molecular weight = 2150), and 39.9 gm of a polyether diol prepared from a bisphenol A and propylene oxide (molecular weight = 580).

The Desmophen 2502 and the polyether mixture were placed in a 2 liter 3 neck flask equipped with a heating mantle temperature controller, thermometer, condenser with drying the tube and a stirrer. While stirring, the mixture was heated to 70° C., followed by the addition of the IPDI and the Hexamethylene diisocyanate (Desmodur H, from Bayer AG or from Mobay Corporation). The components were stirred and heated to 90°-105° C. The mixture was reacted for 4-5 hours at 95°-105° C. An NCO-terminated prepolymer with an NCO content of 3.54% (theoretical NCO content 3.72%) resulted.

The prepolymer (1) was divided into equal portions (400 grams each) to make three dispersions with the various chain extender compositions described below.

Accordingly, Dispersion 1a was thus prepared:

| Grams | EW | Charge |
|---|---|---|
| 400 | | Prepolymer 1 |
| 7.59 | 30 | ethylenediamine |
| 43.01 | | Demineralized water for the chain extender solution |
| 565.46 | | Demineralized water for dispersing |

400 grams of prepolymer 1 at 80° were charged slowly over a period of 3-5 minutes to a 2 liter resin flask which contained 565.46 grams of Demineralized water (25°-35° C.) under rapid agitation.

Upon completion of the dispersion step, an amine solution consisting of 7.59 grams of ethylenediamine and 43.01 grams of demineralized water was slowly added to the dispersed prepolymer over a 3-5 minute period. The aqueous polyurethane dispersion was then heated to 70° C. for 4 hours to react off any remaining isocyanate. The resulting product was a stable, fine particle size aqueous dispersion of polyurethane-urea which exhibited excellent adhesion to plasticized PVC and gave a softening point under ASTM D-816 (in peel) of 106° C.

Dispersion 1b was prepared following a similar procedure using the following charge: (the amounts noted are in grams)

| Grams | EW | Charge |
|---|---|---|
| 400 | | prepolymer 1 |
| 6.83 | 30 | ethylenediamine |
| .86 | 34 | diethylenetriamine |
| 43.58 | | demineralized water (for the chain extender solution) |
| 565.05 | | demineralized water (for dispersing the prepolymer) |

The resulting aqueous dispersion of polyurethane-urea was stable and had a fine particle size. It exhibited excellent adhesion to plasticized PVC and had a softening point (ASTM D-816, in peel) of 137° C.

Dispersion 1c was prepared by the procedure described above, using the following charge:

| Grams | EW | Charge |
|---|---|---|
| 400 | | prepolymer 1 |
| 6.07 | 30 | ethylenediamine |
| 1.72 | 34 | diethylenetriamine |
| 44.14 | | demineralized water (for the chain extender solution) |
| 564.64 | | demineralized water (for dispersing the prepolymer) |

The resulting aqueous dispersion was stable, fine particle size aqueous dispersion of polyurethane-urea which exhibited excellent adhesion to plasticized PVC and which had a softening point (ASTM D-816, in peel) of 150° C.).

The results clearly demonstrate the effectiveness of a relatively small amount of added triamine in increasing the softening temperature of the system.

Example 2

An isocyanate-terminated prepolymer (2) was prepared from the following charge:

| Grams | EW | Charge |
|---|---|---|
| 1000 | 1000 | Desmophen 2001 (1,4 butanediol, ethylene glycol adipate) |
| 223 | 322 | Polyether mixture* |
| 292.9 | 111 | IPDI |
| 102.4 | 84 | Desmodur H (hexamethylene diisocyanate) |

*identical to that of example 1

The Desmophen 2001 and the polyether mixture were placed in a 2 liter 3-neck flask equipped with a heating mantle, temperature controller, thermometer, condenser with a drying tube, and stirrer. While stirring, the mixture was heated to 70° C. followed by the addition of the IPDI and Desmodur H. The components were stirred and heated to 95°–105° C. The mixture was reacted for 4–5 hours at 95°–105° C. An NCO-terminated prepolymer with an NCO content of 3.58% (theoretical NCO content = 3.72%) resulted.

The prepolymer 2 was divided into equal portions (400 grams each) to make two dispersions with different chain extender compositions.

| | Dispersion 2a: | |
|---|---|---|
| Grams | EW | Charge |
| 400 | | Prepolymer 2 |
| 7.59 | 30 | Ethylenediamine |
| 43.01 | | Demineralized water for the chain extender solution |
| 565.46 | | Demineralized water for dispersing |

400 grams of prepolymer 2 at 80° C. were charged slowly over a period of 3–5 minutes to a 2 liter resin flask containing 565.46 grams of demineralized water at 25°–35° C., and under rapid agitation.

Following the completion of the dispersing step, an amine solution composed of 7.59 grams of ethylenediamine and 43.01 grams of demineralized water was slowly added to the dispersed prepolymer over a 3–5 minutes period. The aqueous polyurethane dispersion was heated to 70° C. for 4 hours to react off any remaining NCO. The resulting product was a stable, fine particle size aqueous dispersion of polyurethane-urea which exhibited excellent adhesion to plasticized PVC and had a softening point temperature per ASTM D-816 (in peel) of 119° C.

| | Dispersion 2b | |
|---|---|---|
| Grams | EW | Charge |
| 400 | | Prepolymer 2 |
| 6.83 | 30 | ethylenediamine |
| 0.86 | 34 | diethylenetriamine |
| 43.58 | | demineralized water for the chain extender solution |
| 565.05 | | Demineralized water for dispersing |

Using the same procedure as described above with the above listed charge, a stable, fine particle size aqueous dispersion of polyurethane-urea resulted which exhibited excellent adhesion to plasticized PVC and had a softening point temperature of 146° C.

Example 3

An isocyanate terminated prepolymer (3) was prepared from the folowing charge:

| Grams | EW | Charge |
|---|---|---|
| 1000 | 1000 | Desmophen 2502 (1,4 butanediol adipate) |
| 223 | 322 | polyether mixture described in example 1 |
| 261.9 | 87 | toluene diisocyanate (80% 2,4-isomer/20% 2,6 isomer) |

The Desmophen 2502 and the polyether mixture were placed in a 2-liter 3-neck flask equipped with a heating mantle, temperature controller, thermometer, condenser with a drying tube, and stirrer. While stirring, the mixture was heated to 50° C. followed by the addition of the toluene diisocyanate. The components were stirred and heated to 90°–95° C. The mixture was reacted for 3–4 hours at 90°–95° C. An NCO-terminated prepolymer with an NCO content of 3.35% (theoretical NCO content = 3.77%) resulted.

The prepolymer 3 was divided into equal portions (400 grams each) to make two dispersions with various chain extender compositions.

| | Dispersion 3a: | |
|---|---|---|
| Grams | EW | Charge |
| 400 | | prepolymer 3 |
| 7.66 | 30 | ethylene diamine |
| 43.40 | | demineralized water for the chain extender solution |
| 556.5 | | demineralized water for dispersing |

400 grams of prepolymer 3 at 80° C. were charged slowly over a period of 3–5 minutes to a 2 liter resin flask containing 556.5 grams of demineralized water at 25°±° C., and under rapid agitation.

Following the completion of the dispersing step, an amine solution composed of 7.66 grams of ethylenediamine and 43.40 grams of demineralized water was slowly added to the dispersed prepolymer over a 3–5 minutes period. The aqueous polyurethane dispersion was heated to 60° C. for 4 hours to react off any remaining NCO. The resulting product was a stable, fine particle size aqueous dispersion of polyurethane-urea which had a softening point temperature, per ASTM D-816 (in peel) of 125° C.

| | Dispersion 3b | |
|---|---|---|
| Grams | EW | Charge |
| 400 | | prepolymer 3 |
| 6.89 | 30 | ethylene diamine |
| 0.87 | 34 | diethylenetriamine |
| 43.97 | | demineralized water for the chain extender solution |
| 556.11 | | demineralized water for dispersing |

Using the same procedure as was described above, with the charge listed as dispersion 3b, the resulting product was a stable, fine particle size aqueous dispersion of polyurethane-urea which had a softening point temperature, per ASTM D-816 (in peel) of 162° C.

Example 4

An isocyanate-terminated prepolymer (4) was prepared from the following charge:

| Grams | EW | Charge |
|---|---|---|
| 1000 | 1000 | Desmophen 2502 (1,4 butanediol adipate) |
| 223 | 322 | polyether mixture described in example 1 |
| 292.9 | 111 | IPDI |
| 102.4 | 84 | Desmodur H (Hexamethylene diisocyanate) |

The Desmophen 2502 and the polyether mixture were placed in a 2-liter 3-neck flask equipped with a heating mantle, temperature controller, thermometer, condenser with a drying tube, and stirrer. While stirring, the mixture was heated to 70° C. followed by the addition of the IPDI and Desmodur H. The components were stirred and heated to 90°-95° C. The mixture was reacted for 4-5 hours at 95°-105° C. An NCO-terminated prepolymer with an NCO content of 3.41% (theoretical NCO content=3.72%) resulted.

The prepolymer 4 was divided into equal portions (400 grams each) to make two dispersions with various chain extender compositions.

| Dispersion 4a: | | |
|---|---|---|
| Grams | EW | Charge |
| 400 | | prepolymer 4 |
| 22.08 | 85 | Isophorone diamine |
| 125.14 | | demineralized water for the chain extender solution |
| 496.43 | | demineralized water for dispersing |

400 grams of prepolymer 4 at 80° C. were charged slowly over a period of 3-5 minutes to a 2 liter resin flask containing 496.43 grams of demineralized water at 25°-35° C., and under rapid agitation.

Following the completion of the dispersing step, an amine solution composed of 22.08 grams of isophorone diamine and 125.14 grams of demineralized water was slowly added to the dispersed prepolymer over a 3-5 minutes period. The aqueous polyurethane dispersion was heated to 70° C. for 4 hours to react off any remaining NCO. The resulting product was a stable, fine particle size aqueous dispersion of polyurethane-urea which had a softening point temperature, per ASTM D-816 (in peel) of 128° C.

| Dispersion 4b | | |
|---|---|---|
| Grams | EW | Charge |
| 400 | | prepolymer 4 |
| 19.88 | 85 | isophorone diamine |
| 0.88 | 34 | diethylenetriamine |
| 117.63 | | demineralized water for the chain extender solution |
| 501.95 | | demineralized water for dispersing |

Using the same procedure as was described above, with the charge listed as dispersion 4b, the resulting product was a stable, fine particle size aqueous dispersion of polyurethane-urea which had a softening point temperature, per ASTM D-816 (in peel) of 160° C.

Example 5

In the table below there are summarized the results of a series of experiments demonstrating the invention in the context of adhesives based of any of a variety of polyesters differing one from the other in terms of their respective degree of crystallinity.

| POLYESTER | PREPOLYMER/ISO | CHAIN EXTENDER AMINES EQUIV. RATIO | TRIAMINE WT. % | TRIAMINE EQ % | SOFTENING PT. (°C.) |
|---|---|---|---|---|---|
| amorphous | IPDI[a]/HX[b] | EDA[c] 100 | 0 | 0 | 119 |
| amorphous | IPDI/HX | EDA 90/DETA[d] 10 | .21 | 3.15 | 140 |
| semi cryst. | IPDI/HX | EDA 100 | 0 | 0 | 119 |
| semi cryst. | IPDI/HX | EDA 90/DETA 10 | .23 | 3.42 | 146 |
| crystalline | IPDI/HX | EDA 100 | 0 | 0 | 140 |
| crystalline | IPDI/HX | EDA 95/DETA 5 | .11 | 1.64 | 154 |
| crystalline | IPDI/HX | EDA 90/DETA 10 | .22 | 3.26 | 166 |
| crystalline | IPDI/HX | EDA 60/DETA 40 | .87 | 13.12 | 90 |
| crystalline | IPDI/HX | EDA 90/TAN[e] 10 | .37 | 3.26 | 162 |
| crystalline | TDI | EDA 100 | 0 | 0 | 125 |
| crystalline | TDI | EDA 90/DETA 10 | .21 | 3.16 | 162 |

[a]IPDI denotes isophorone diisocyanate
[b]HX denotes hexamethylene diisocyanate
[c]EDA denotes ethylenediamine
[d]DETA denotes diethylenetriamine
[e]TAN denotes triaminononane The results point to that the small addition of DETA as a chain extending agent causes a considerable increase in the softening point temperature of the adhesive. It was also noted that adding DETA beyond a certain level causes a decrease in the softening point.

Example 6

An additional set of experiments was conducted aimed at identifying the limits on the operability of the invention. The results are tabulated below. In this set of experiments, the prepolymer was based on 1,4 butanediol adipate, IPDI and hexamethylene diisocyanate. The chain extending systems are noted in the table below. It should be noted that the use of diethylene triamine (DETA) as the sole chain extending agent is impractical as it results in an unworkable system.

| Chain extending system | triamine weight % | triamine equivalent % | softening temp. (°C.) |
|---|---|---|---|
| 100% IPDA | 0 | 0 | 128 |

-continued

| Chain extending system | triamine weight % | triamine equivalent % | softening temp. (°C.) |
|---|---|---|---|
| 90% IPDA/10% DETA | 0.21 | 3.28 | 160 |
| 100% water | 0 | 0 | 92 |
| 90% water/10% DETA | 0.23 | 3.37 | 107 |
| 100% EDA | 0 | 0 | 126 |
| 95% EDA/5% DETA | 0.11 | 1.64 | 154* |
| 90% EDA/10% DETA | 0.22 | 3.26 | 161 |
| 80% EDA/20% DETA | 0.44 | 6.6 | 173** |
| 75% EDA/25% DETA | 0.55 | 8.25 | 100 |
| 70% EDA/30% DETA | 0.66 | 9.9 | 82 |
| 65% EDA/35% DETA | 0.77 | 11.6 | 82 |

*The functionality of this chain extender system is 2.05
**The functionality of this chain extender system was 2.20

The results point to that the softening point of the system improves markedly upon the use of a relatively small amount of the triamine chain extender.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An adhesive comprising a stable, fine particle size aqueous dispersion of polyurethane-urea which is the reaction product of an isocyanate-terminated prepolymer with an amine-containing chain extending agent which is characterized in that
   (i) the functionality of said agent is about 2.05 to about 2.20, and
   (ii) the softening point temperature of said adhesive is greater than that of a corresponding adhesive which contains no such chain extending agent.

2. The adhesive of claim 1 wherein said agent comprises a hydrocarbon polyamine.

3. The adhesive of claim 2 wherein polyamine contains 2 to 15 carbon atoms.

4. The adhesive of claim 1 wherein said agent is at least one member selected from the group consisting of 1-amino-3-aminomethyl-3,5,5-trimethyl-cyclohexane, bis-(4-aminocyclohexyl)-methane, bis-(4-amino-3-methylcyclohexyl)-methane, 1,6-diaminohexane, ethylene diamine, diethylene triamine, triethylene tetramine, tetraethylene pentamine and pentaethylene hexamine.

5. The adhesive of claim 1 wherein the ratio between the terminal isocyanate groups of said prepolymer and amino hydrogens of said polyfunctional amine agent is between about 1.0:0.06 to 1.0:1.1.

* * * * *